No. 652,242. N. W. BOYD, Dec'd. Patented June 26, 1900.
E. J. BOYD, Executrix.
BICYCLE GEAR.
(Application filed Feb. 9, 1898.)

(No Model.)

Witnesses
Inventor
Nathaniel W. Boyd
By Edson Bro's
Attorneys

UNITED STATES PATENT OFFICE.

NATHANIEL W. BOYD, OF CARLISLE, PENNSYLVANIA; EMMA J. BOYD, EXECUTRIX OF SAID NATHANIEL W. BOYD, DECEASED, ASSIGNOR OF THREE-EIGHTHS TO GEORGE HEMINGERY AND JOHN R. MILLER, OF SAME PLACE.

BICYCLE-GEAR.

SPECIFICATION forming part of Letters Patent No. 652,242, dated June 26, 1900.

Application filed February 9, 1899. Serial No. 705,104. (No model.)

*To all whom it may concern:*

Be it known that I, NATHANIEL W. BOYD, a citizen of the United States, residing at Carlisle, in the county of Cumberland and State of Pennsylvania, have invented certain new and useful Improvements in Bicycle-Gear; and I do hereby declare the following to be a full, clear, and exact description of the invention, such as will enable others skilled in the art to which it appertains to make and use the same.

This invention relates to improvements in bicycles and other cycling-machines in which the chain is dispensed with and in place thereof motion is communicated from the crank-shaft to the axle of the driving-wheel by means of a rotating shaft and gearing connected therewith; and its object, among other things, is to provide an improved connection between the crank-shaft and the driving wheel or wheels the parts of which are easy of access and which embody the features of durability and strength of parts and increased speed combined with the minimum amount of friction in the movement of the parts.

To these ends the invention consists in providing a shaft suitably mounted within a casing secured to the frame of the machine and provided at one end with a worm of peculiar construction detachably secured to said shaft and adapted to be operated by a sprocket or toothed wheel mounted upon the crank-shaft. At the opposite end the shaft is provided with suitable gearing, as bevel-pinions, the gearing at both ends of the shaft being inclosed in said casing, which is rigidly secured to the frame of the machine. Bearings of peculiar arrangement are also provided, whereby the friction is reduced to the minimum.

My invention relates to an improvement in bicycles; and it consists in the peculiar construction and combination of devices that will be more fully set forth hereinafter, and particularly pointed out in the claim.

Figure 1:
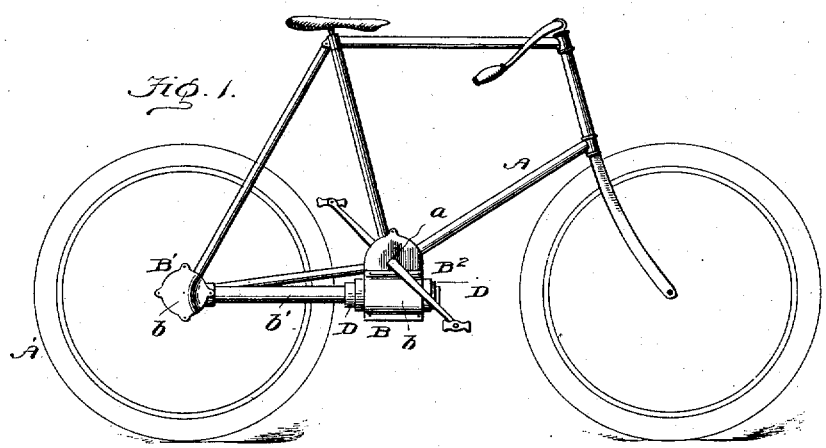
Figure 2:
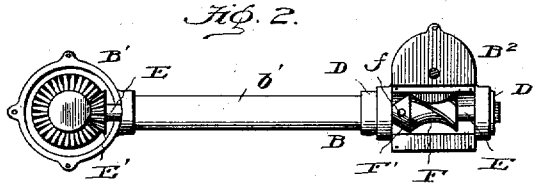
Figure 3:
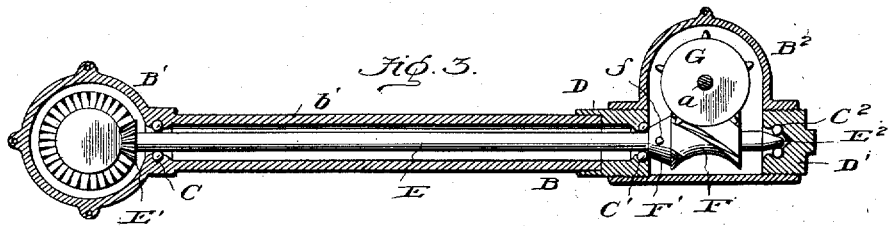
Figure 4:
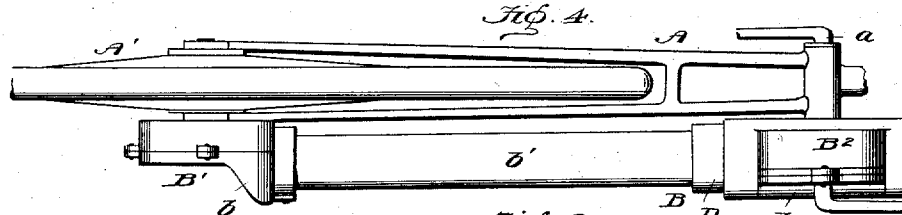
Figures 5, 6:
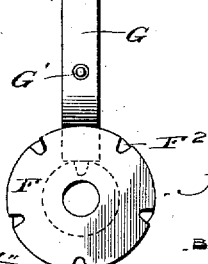
Figure 7:
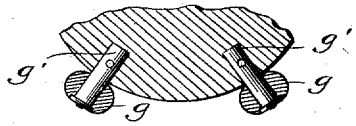

In the accompanying drawings, Figure 1 is a side elevation of a bicycle embodying my improvements. Fig. 2 is a view showing the casing detached and the caps removed therefrom. Fig. 3 is a vertical longitudinal section through the casing. Fig. 4 is a top plan view showing the casing attached to the wheel. Fig. 5 is a detail view showing the worm detached. Fig. 6 is an end view of the worm and the driving-wheel engaging therewith. Fig. 7 is a view of a portion of a sprocket, showing roller-teeth thereon.

Referring to said drawings by letters of reference, A represents the frame of the bicycle, which is of the form shown, and B represents the gear-casing. The rear or driving wheel A' has a bevel gear-wheel $A^2$ on one end of its shaft, and secured to the contiguous portion of the frame is a cap B', comprising the sections $b$ $b^2$, which are separable and bolted together, as at H. The section $b^2$ is secured to the frame and is provided at its front side with a tubular casing $b'$, which may be formed with the said section $b^2$ or attached thereto, as may be preferred. The said section $b^2$ is of sufficient depth to receive the gear-wheel $A^2$, and when the section $b$ is bolted in place said gear-wheel is entirely incased and protected from dust and sand.

The toothed wheel G on the crank-shaft is incased in a cap $B^2$, which is similar in construction to the cap B', comprises the two separable sections $b^3$ $b^4$, bolted together, as at $b^5$, and formed with the lower portion of the section $b^3$ is a cylindrical housing $b^6$, having at its inner end a bushing D, screwed in place, and at its outer end a screw-plug D'. The said bushing D is socketed to receive the front end of the tubular casing $b'$ and is connected tightly thereto. A ball-bearing C is at the rear end of the tubular casing $b'$. A second ball-bearing C' is in the bushing D, and a third ball-bearing is in the inner side of the screw-plug D'.

Mounted within the bearings C C' is a rod E, to the rear end of which is secured a pinion E', while its opposite end is tapered and adapted to rest within the bearing $C^2$, as shown at $E^2$, thereby preventing any forward thrust of the shaft. Encircling said shaft E within the portion $B^2$ of the casing is a worm F, of the peculiar form shown. The surface of said worm is concaved, so as to present the greatest possible surface to the wheel G, meshing therewith, and has preferably a tapered end F', which serves to bear against the balls C', thereby preventing any backward thrust of the worm when in operation. Worm F may be detachably secured to the shaft E in any desired manner, as by means of a screw $f$, adapted to pass completely through the tapered end of the worm and the shaft therein, and whereby said worm can be readily removed and replaced in the event of wear or leakage.

Cut into the concave-surface worm F are grooves $F^2$, each of which is adapted to receive a tooth $G'$ of the toothed wheel G. The grooves $F^2$ and the teeth $G'$ are so arranged that one tooth at a time is meshing with the worm. By this arrangement several revolutions of the worm and its shaft may be obtained with the minimum amount of friction.

The teeth $G'$ of the toothed wheel G may, if desired, be of the form shown in Fig. 7, wherein each tooth is shown as a roller $g$, adapted to revolve upon a short arm $g'$, projecting from the wheel G, and which may be detached and replaced in case of breakage. By so constructing the teeth friction is still further reduced and a gearing smooth and easy in operation is secured.

It is obvious that by threading the caps D D', as shown, with threads of small pitch the wear on the bearings can be readily taken up by turning said caps inward.

Having thus fully described my invention, what I claim as new, and desire to secure by Letters Patent, is—

In a bicycle, the gear A, on the driving-wheel shaft, the toothed wheel G on the crank-shaft, the cap B', incasing the wheel $A^2$, and comprising the section $b^2$ secured to the frame and the removable section $b$; the cap $B^2$ incasing the wheel G and comprising the section $b^3$ secured to the frame, and the removable section $b^4$; said section $b^3$ having the cylindrical housing $b^6$ on its lower side; the tubular casing $b'$ connecting the said caps B', $B^2$, the bushing D, in the rear end of housing $b^6$ and having a socket to receive the front end of the casing $b'$, the screw-plug D' at the front end of said housing; in combination with the shaft E, in bearings in said casing $b'$, bushing D, and screw-plug D'; said shaft having the worm F engaging the wheel G, and the pinion E' engaging the gear-wheel $A^2$, substantially as described.

In testimony whereof I affix my signature in presence of two witnesses.

NATHANIEL W. BOYD.

Witnesses:
MORVEN THOMPSON,
H. D. LAWSON.